United States Patent
Gifford (10) Patent No.: US 10,116,909 B2
(45) Date of Patent: *Oct. 30, 2018

(54) DETECTING A VERTICAL CUT IN A VIDEO SIGNAL FOR THE PURPOSE OF TIME ALTERATION

(71) Applicant: Prime Image Delaware, Inc., Chalfont, PA (US)

(72) Inventor: Christopher Scott Gifford, Nipomo, CA (US)

(73) Assignee: PRIME IMAGE DELAWARE, INC., Chalfont, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,817

(22) Filed: Aug. 11, 2015

(65) Prior Publication Data

US 2015/0350495 A1    Dec. 3, 2015

Related U.S. Application Data

(63) Continuation of application No. 13/755,986, filed on Jan. 31, 2013, now Pat. No. 9,113,133.

(60) Provisional application No. 61/592,849, filed on Jan. 31, 2012.

(51) Int. Cl.
| | |
|---|---|
| *H04N 17/00* | (2006.01) |
| *H04N 9/87* | (2006.01) |
| *G11B 27/031* | (2006.01) |
| *G11B 27/10* | (2006.01) |
| *G11B 27/28* | (2006.01) |
| *H04N 5/14* | (2006.01) |
| *H04N 5/91* | (2006.01) |

(52) U.S. Cl.
CPC ............ *H04N 9/87* (2013.01); *G11B 27/031* (2013.01); *G11B 27/10* (2013.01); *G11B 27/28* (2013.01); *H04N 5/147* (2013.01); *H04N 5/91* (2013.01)

(58) Field of Classification Search
CPC ........................................................ H04N 5/85
USPC ........................................................ 386/241
See application file for complete search history.

(56) References Cited

U.S. PATENT DOCUMENTS

| | | |
|---|---|---|
| 4,464,784 A | 8/1984 | Agnello |
| 4,757,540 A | 7/1988 | Davis |
| 5,023,888 A | 6/1991 | Bayston |
| 5,627,581 A | 5/1997 | Kondo |
| 5,995,153 A | 11/1999 | Moeller et al. |
| 6,026,232 A | 2/2000 | Yogeshwar et al. |

(Continued)

*Primary Examiner* — Jefferey F Harold
*Assistant Examiner* — Sihar Karwan
(74) *Attorney, Agent, or Firm* — Dergosits & Noah LLP (57) ABSTRACT

A circuit and method for detecting a vertical cut in a sequence of digital video images. Each pixel of a video frame is filtered then compared to a filter threshold. If the threshold is met, a current pixel bit is set as active. A delayed pixel bit is generated from the current pixel bit, and a changed pixel bit is generated if either but not both of the current pixel bit and the delayed pixel bit is active. Active pixels are counted. The count of active pixels in the current image and the count of active pixels in the delayed image are used to weight the active pixel count of the changed image. The counts are used to determine a change value for the current image. The change value may be a large positive value, a large negative value, or neither. A predefined pattern of the change values over a sequence of frames indicates a vertical cut in the sequence.

11 Claims, 8 Drawing Sheets

(56) References Cited

U.S. PATENT DOCUMENTS

| | | | | |
|---|---|---|---|---|
| 6,144,364 | A * | 11/2000 | Otobe | G09G 3/2022 345/63 |
| 6,178,317 | B1 | 1/2001 | Kroeger et al. | |
| 6,456,337 | B1 * | 9/2002 | Kobayashi | G09G 3/2022 348/615 |
| 6,683,645 | B1 * | 1/2004 | Collins | H01L 27/14603 348/252 |
| 6,928,233 | B1 * | 8/2005 | Walker | G06F 17/30787 348/700 |
| 6,972,868 | B1 * | 12/2005 | Gondek | H04N 1/41 358/1.9 |
| 7,092,774 | B1 | 8/2006 | Gifford et al. | |
| 8,340,472 | B2 * | 12/2012 | Yamada | G06K 9/4609 348/448 |
| 2007/0279532 | A1 * | 12/2007 | Yamauchi | H04N 7/0115 348/701 |
| 2010/0169576 | A1 * | 7/2010 | Chen | G06F 12/0897 711/122 |
| 2011/0102600 | A1 * | 5/2011 | Todd | H04N 17/004 348/180 |
| 2011/0122255 | A1 * | 5/2011 | Haritaoglu | G06K 9/00711 348/180 |

* cited by examiner

DETECTING A VERTICAL CUT IN A VIDEO SIGNAL FOR THE PURPOSE OF TIME ALTERATION

CROSS REFERENCE

This disclosure is a continuation of U.S. patent application Ser. No. 13/755,986 entitled Method and System for Detecting A Vertical Cut in a Video Signal for the Purpose of Time Alteration, filed Jan. 31, 2013, and claims priority from U.S. Provisional Patent App. No. 61/592,849 entitled Method and System for Analyzing and Detecting Vertical Cuts in a Video Signal for the Purpose of Time Alteration of a Program's Runtime, filed Jan. 31, 2012, both of which are incorporated by reference herein.

TECHNICAL FIELD

The present invention relates to circuits and methods for altering the running time of a digital video program signal, and in particular, to circuits and methods for analyzing a sequence of video images in order to detect a vertical cut transition from one video segment to the next.

BACKGROUND

A digital audio/video program is a collection of various audio and video segments arranged in a linear sequence. The method used to join each segment together is called a transition. Several common video transition methods are known, such as vertical cuts, wipes, dissolves, fades-to-black and fades-from-black.

A "cut" is an abrupt change from one scene to another and is the simplest and most basic transition method. The term "cut" comes from the process of film editing where two segments of film were physically cut and then spliced together to produce an instant transition. In modern digital video, the term "vertical cut" is used to indicate the transition that occurs at the vertical boundary between images of the video signal.

Time alteration of a video program is the process of adding or removing individual frames of video to lengthen or shorten the duration of the program. The challenge of time alteration is finding locations within the program to add or remove frames without the viewer noticing. The abrupt change of a vertical cut provides the perfect opportunity to remove or duplicate one or more video frames without any noticeable artifact.

Techniques for time alteration of the corollary audio signal are known to those skilled in the art. For example, commonly-assigned U.S. Pat. No. 7,092,774, entitled Multi-Channel Audi Processing System with Real-time Program Duration Alteration, incorporated herein by reference, discloses techniques operable in real-time to alter the running time of a program signal, and in particular, to techniques particularly suited to operate on multi-channel audio program signals.

It would be desirable to have corresponding methods for analyzing the video signal in order to concurrently alter the run time of both the audio and video signals in a digital audio/video program. In order to effectively do so for video signals, an effective method to detect vertical cuts in the video signal is required.

DETAILED DESCRIPTION

1. Overview

Circuits and methods are described for detecting a vertical cut in a sequence of video images. The detection circuits and techniques disclosed herein are optimized for the purpose of analyzing and positively detecting a vertical cut in the video sequence for the purpose of altering the run time of a video program. These circuits and techniques are required to process all forms of video on-the-fly, including progressive, interlaced, and those produced by telecine conversion to meet the demands of live real-time video broadcast. Digital video program material may be taken into the signal processing system in either uncompressed video (Serial Digital Interface—SDI), or an encoded file. Time altered program segments may be output from the signal processing system in either SDI video, or an encoded file.

Each pixel within a video frame is filtered to remove pixel values that are the same as neighboring pixels, for example, common brightness and color values. The filtered pixel is then compared to a filter threshold, and if the threshold is met, a single indicator bit ("current pixel bit") is set to an active state. The result is a simplified frame where each single bit pixel is active only where picture detail is present.

A second indicator bit, delayed by one frame ("delayed pixel bit") is generated from the current pixel bit to compare motion between frames (current and delayed images). A masking technique is used around the current and delayed pixel bits combined with a XOR function to filter out slight changes in motion. A third indicator bit ("changed pixel bit") is generated if either but not both of the current pixel bit and the delayed pixel bit is active. All active pixels in the current image, the delayed image, and the changed image are counted. If the count of active pixels in the current image is similar to the count of active pixels in the delayed image, then a low weighting factor is applied to the active pixel count of the changed image. If the count of active pixels in the current image is disparate from the count of active pixels in the delayed image, then a high weighting factor is applied to the active pixel count of the changed image.

The weighted active pixel count of the changed image is divided by the maximum active pixel count of either the current or delayed images to yield a percent change value for the current image. The change value is compared to a large positive threshold, and a "positive" change bit is set if change value is greater than the large positive threshold. The change value is also compared to a large negative threshold, and a "negative" change bit is set if the change value is less than the large negative threshold. If the change value is not larger than the positive threshold and not smaller than the negative threshold, then a "none" change bit is set indicating a negligible change in the current image.

Each pixel in a number of sequential frames is processed, and if the pattern of change bits meets a predefined pattern, then a vertical cut has been detected.

2. Video Formats

The run time of a video program may be altered by adding or removing individual frames to lengthen or shorten the duration of the video program. The challenge associated with time alteration schemes is to find locations within the video program to add or remove frames without the viewer noticing. The abrupt change of a vertical cut provides the perfect opportunity to remove or duplicate one or more video frames without any noticeable artifact.

However, vertical cuts can be difficult to detect in a real-time video signal. Many known methods produce less than optimal results since they were originally designed for legacy video formats, and may rely upon operating conditions that no longer exist. The variety of video formats encountered today make the detection of vertical cuts even more difficult.

Before the introduction of High Definition (HD) video, most video signals typically used an interlaced video format in which two fields are required to make one complete frame, e.g., an odd field having the odd-numbered horizontal lines of the frame, and an even field having the even-numbered horizontal lines of the frame. It was generally understood that all vertical cuts should occur at the vertical boundary preceding the first field. However, the introduction of HD video allows video programs to be edited in progressive (non-interlaced) formats such as 720p and 1080p. The result is that when such programs are later converted to interlaced video, the vertical cuts may occur on either or both of the odd and even field boundaries.

Some video media, such as film, provide video content that was created at 24 frames per second (Fps). In the United States and other countries where the television standard is 29.97 Fps, the 24 Fps content is converted to 29.97 Fps by a telecine process. This method converts every four frames into five frames by adding an extra video field to the odd frames (3 field, 2 field, 3field, 2 field). This 3:2:3:2 sequence may not be consistent when content is edited after conversion to 29.97 Fps, and such a sequence is referred to as a broken sequence. The sequence can be further broken when it is combined with true video content and graphics created at 29.97 Fps.

All of the various types of video formats must be considered when employing techniques to look for a vertical cut. It is known that by comparing adjacent video frames, a signal can be produced representing the change in the picture, where this change may be due to either motion in the video segment, a telecine sequence, or a vertical cut. However, the detection scheme disclosed herein has the ability to ignore changes due to motion or any telecine sequence and isolate just the vertical cuts. A person of ordinary skill in the art will appreciate that the techniques described herein are applicable to the processing of interlaced or progressive video.

3. Apparatus for Detecting Vertical Cuts

A modern digital video signal contains a series of sequential images, each made from a group of sequential pixels. Each pixel is typically composed of several components each having a numerical value, for example, a luminance (brightness) component LUMA and a chrominance (color) component CHROMA, each having numerical values representing the amplitude or brightness of a pixel and its color. In a common embodiment, the numerical values are 10-bit numbers producing an amplitude range of over 1000 levels. Other common component formats such as RGB will work equally well with this process.

Traditional detectors directly compare two sequential images to determine a magnitude of change between images. The result is a signal of varying amplitudes for each pixel in the image. Traditional detectors total these varying amplitudes for each pixel to arrive at a total magnitude of change for the image, often called a sum-of-absolute-differences (SAD). However, using the traditional method, it is difficult to determine if the change is due to motion, 3:2 sequences, or vertical cuts. Depending on the content of the original images, large solid objects might produce very little change during motion, while a small object high in detail can produce a large change while in motion. This makes it difficult to determine how much of the total change is due to motion. Additionally, video with a 3:2 sequence could produce a total change result of zero every five images, as the extra repeated images are compared with their identical neighbors.

In this disclosure, a different approach is taken by first converting each image into a simple quantifiable single bit form. This is done for three reasons. First, by simplifying the image to a minimum amount of information, there will be less overlap in the event of a vertical cut when it is compared to a neighboring image. Second, by using only one bit per pixel, logical manipulations can be performed on the image, which is not possible with a standard video image. Third, the amount of information within the image can be absolutely measured and used to determine a percentage-of-change between images, which is not possible with a standard video image.

Once a vertical cut is detected, frames or fields may be added or removed at that point as required to provide a time altered video program. To that end, a real-time circuit for simplifying and analyzing video signals will now be described.

Figure 1:
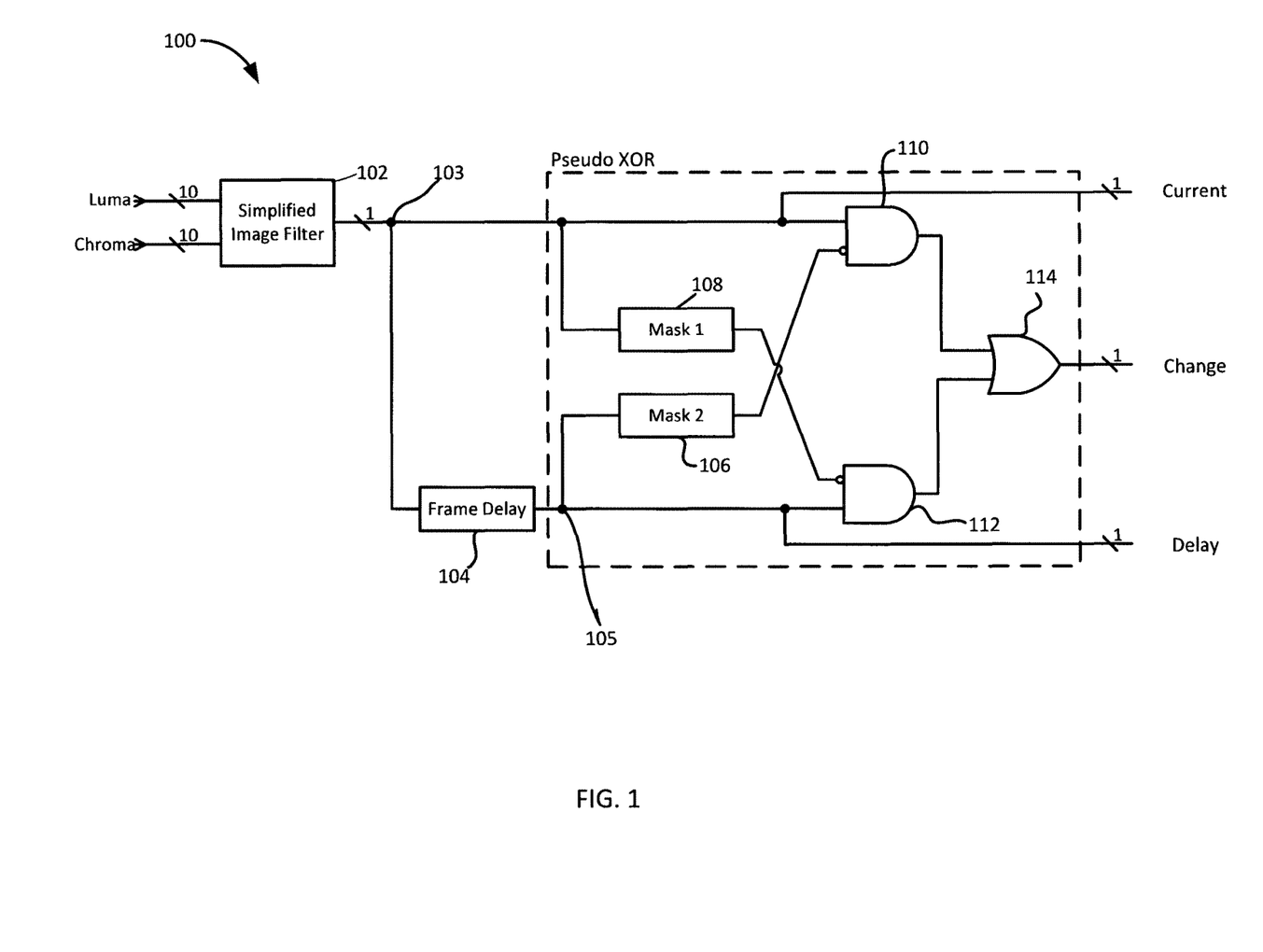
FIG. 1 is a block diagram illustrating a circuit for conversion of a multi-bit pixel to a single-bit representation.

A. Image Simplification:

Referring now to FIG. 1, a circuit 100 for generating a simplified image having only active changed pixels is illustrated. In this embodiment, the input signal to the circuit 100 has two components, namely the luminance component (LUMA) and the chrominance component (CHROMA), which are numerical values representing the amplitude or brightness of a pixel and its color, respectively. These numerical values are typically 10-bit numbers capable of a range having over 1000 levels. Alternately, other components could be used such as RED, GREEN, and BLUE for a RGB format.

An image filter 102 receives the input signal (LUMA and CHROMA components) for each pixel and converts the signal to a single bit output at node 103 representing a simplified current image labeled CURRENT. Note: The CHROMA component is not required to produce the simplified image, but it does improve the overall accuracy. The image filter 102 is further illustrated in FIG. 2 and explained in more detail below.

The simplified current image CURRENT is also passed through a delay element 104 which generates a delayed image DELAY at node 105, which is the simplified current image CURRENT delayed by one frame (or two fields). This allows the most recent simplified image CURRENT to be compared with the simplified image that occurred one frame (or two fields) earlier, namely the delayed simplified image DELAY. One frame (or two fields) of delay is used for interlacing schemes so that a field-1 is only compared with another field-1, and not with a field-2. This eliminates any adverse effects that might be produced by differences in vertical detail between field-1s and field-2s.

It might be assumed that subtracting the delayed image from the current image of a subject that is not moving would produce a complete cancellation and thus no change. This assumption is incorrect for several reasons: the subject may be imperceptibly moving due to actions such as breathing; the camera may not be steady; mechanical errors may be produced by film scanners; and random noise may be present. All of these factors can cause the subject to move at least a few pixels in any direction. Comparing the images directly may falsely detect a large change if the entire image actually moves by only a few pixels.

Therefore, before comparing the simplified current and delayed images, a mask 106 is generated to filter out slight changes in motion in the current image, while a mask 108 is generated to filter out slight changes in motion in the delayed image. Each of the masks 106, 108 is created by stretching each active pixel bit in the image both horizontally and vertically. Stretching occurs by combining multiple delay taps of the active pixels through an OR gate, and uses horizontal line delays for vertical stretching and pixel clock delays for horizontal stretching. The mask represents an area around active pixels in the image where motion will be ignored. The size of the mask determines how much motion is required before it is detected. Stretching by a few pixels in each direction is adequate to mask out slight changes in motion. Masks are created for both the current image and the delayed image.

To determine the change between the current and delayed images, a pseudo exclusive-or (XOR) function is used. As is well-known, XOR is a logic function where the output is active if either input is active, but not if both inputs are active at the same time. The pseudo XOR function described herein is similar, except that the mask signals are used to combine the active pixels. The output from mask 106 is inverted and fed into AND gate 110. Likewise, the output from mask 108 is inverted and fed into AND gate 112. The other input to AND gate 110 is the current image CURRENT, while the other input to AND gate 112 is the delayed image DELAY. The outputs from AND gate 110 and AND gate 112 are fed into OR gate 114 and the resultant output is a new changed image CHANGE having active pixels from both images, except where the image was nominally the same (such as a subject not in motion). The resulting change image contains only active pixels due either to large motion, or to vertical cuts.

Figure 2:
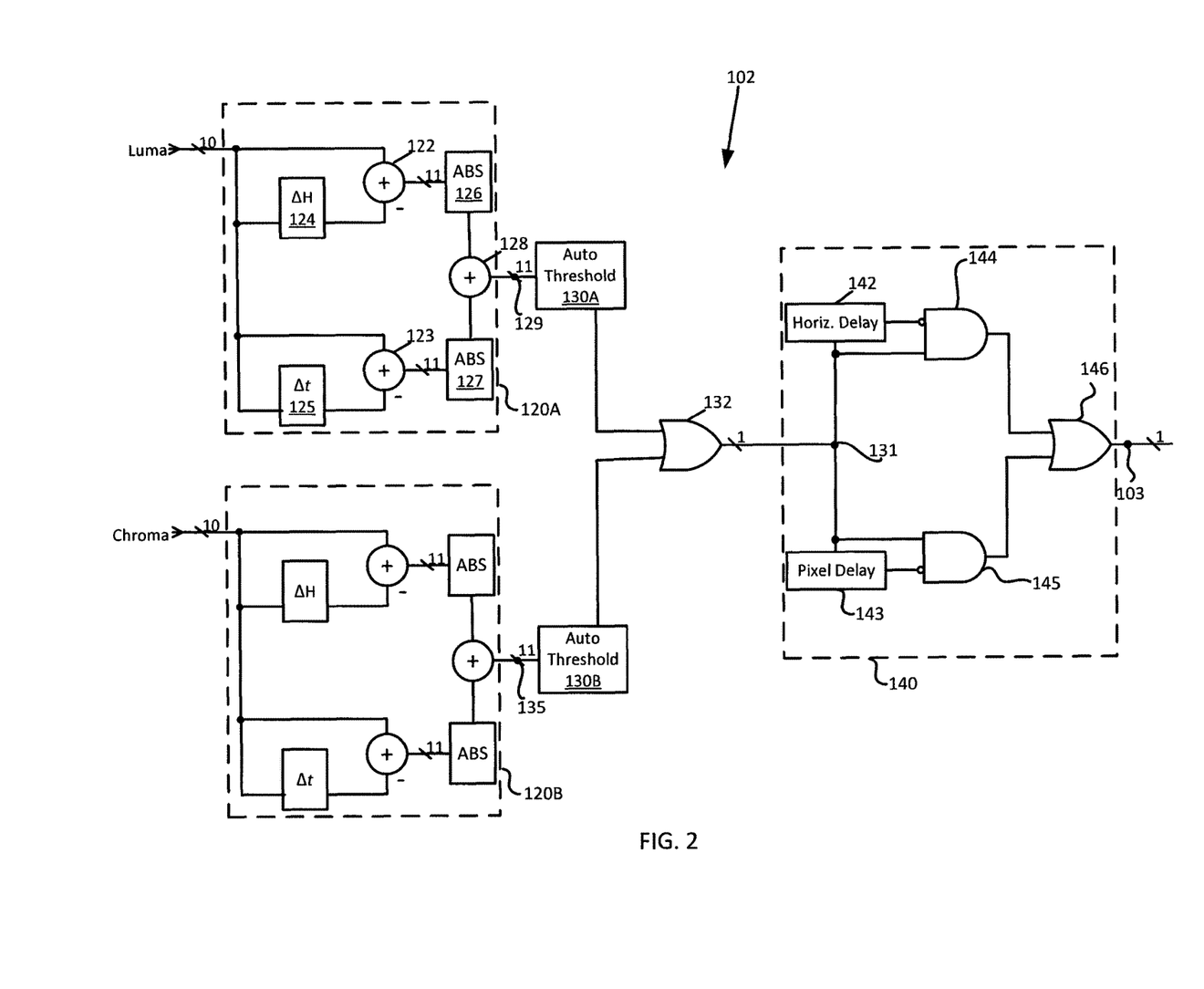
FIG. 2 is a block diagram illustrating a circuit for an image filter portion of FIG. 1.

Referring now to FIG. 2, the simplified image filter 102 is shown in more detail. Each video component (LUMA and CHROMA in this embodiment) is filtered individually and combined with an OR gate 132 at the final output filter. A differential filter 120A is used in both the horizontal and vertical directions to remove unwanted information from each pixel within the LUMA component of the video image. Likewise, a differential filter 120B is used in both the horizontal and vertical directions to remove unwanted information from each pixel within the CHROMA component of the video image. The differential filters 120A, 120B each compare neighboring pixels to subtract out common colors and amplitude values. This has the effect of eliminating large solid areas of the picture and leaves only image detail.

In one embodiment, one part of the differential filter 120A receives the LUMA component directly as an input to adding circuit 122 (which is configured as a subtracting circuit), and also as an input to a vertical aperture 124. The vertical aperture 124 is a delay element having increments of horizontal lines (ΔH) where each H is equivalent to a one pixel shift in the vertical direction. The output of the vertical aperture 124 is the subtracted input to the adding circuit 122. The output of the adding circuit 122 is an 11-bit value (10 bits plus a sign bit) that is input to an absolute value circuit (ABS) 126, resulting in a 10-bit positive value. Likewise, the other part of the differential filter 120A also receives the LUMA component directly as an input to adding circuit 123 (which is configured as a subtracting circuit), and also as an input to a horizontal aperture 125. The horizontal aperture 125 is a delay element (Δt)) where each t is equivalent to a one pixel shift in the horizontal direction. The output of the horizontal aperture 125 is the subtracted input to the adding circuit 123. The output of the adding circuit 123 is an 11-bit value (10 bits plus a sign bit) that is input to an absolute value circuit (ABS) 127, resulting in a 10-bit positive value. The 10-bit differential outputs from ABS circuits 126 and 127 are added together by adding circuit 128 to yield an 11-bit value at node 129 representing a filtered image containing only the desired details of the original image.

The aperture, or number of pixels used in the differential filters 120A, 120B, determines the range of details, from fine to course, that are to be kept. The aperture is adjusted to highlight the edges of objects such as a person's body or face but ignore very high detail, such as blades of grass or strands of hair, which would overwhelm the result. The aperture values are determined by the images resolution and will be different for each video standard. The actual values used were determined experimentally to achieve the best performance.

The details within the filtered images at nodes 129 and 135 each produce waveforms with peaks varying in amplitude and width, and must be further simplified. Using comparator circuits 130A and 130B, the pixels in each component's filtered image are each compared with a threshold value and a single bit is set at node 131 if detail is present in either the LUMA component or the CHROMA component. Because the amplitude of each waveform varies, a fixed threshold will not produce optimum results, therefore, for each component an adaptive threshold is used. In one embodiment, a varying upper magnitude is produced by interpolating between peak values of the waveform, and a lower magnitude is produced by a continuous average of all values of the waveform. The threshold is set to a value half way between the upper and lower magnitudes plus a fixed offset to account for signal noise. This effectively slices the varying amplitude waveform, producing a single bit result for each pixel.

The single bit results from evaluating the LUMA and CHROMA components (or RED, GREEN, and BLUE if using RGB components) are combined through an OR gate 132. Thus, if either or both of the LUMA and CHROMA signals lead to the generation of a single bit after threshold comparison, then the output of the OR gate 132 is also a single active bit at node 131. Due to the waveform's varying widths, the single bit results will also vary in width. A final filter 140 is used to reduce the width by eliminating all continuous set bits after the first pixel. The single bit at node 131 is provided as an input to horizontal delay circuit 142, pixel delay circuit 143, AND gate 144, and AND gate 145. The output of the horizontal delay circuit 142 is inverted and input to AND gate 144. The output of the vertical delay circuit 143 is inverted and input to AND gate 145. The output of the AND gates 144 and 145 are input to the OR gate 146, and the output of the OR gate is a simplified one-bit representation of all detail within the pixel image, at node 103.

B. Image Analysis:

The active pixels for the simplified CURRENT, DELAY, and CHANGE images are each counted. These counts are used to determine if change has occurred, what type of change, and to calculate a final percentage-of-change that ignores motion. The method of counting and the calculations used will be presented in more detail below. A simplified analysis is demonstrated by the following examples.

EXAMPLE 1

Assume an object within the image produces 25 active pixels. If the object is moving, it will be present in numerous frames. Therefore, the CURRENT count will be 25 and the DELAY count will be 25. The CHANGE count could be as high as 50 if there is no overlap between frames. By comparing the CURRENT and DELAY counts, no substantial difference is found (25−25=0). A weighting factor is created that is proportional to the difference value. A low weighting value indicates a likelihood that the CHANGE count is mostly due to motion. In this case, a low weighting factor of 0% will be applied to the CHANGE count, reducing it to a value approaching zero (50×0%=0). If the adjusted CHANGE count is divided by the maximum count, then the percentage-of-change equals 0% (0/25=0.0). Therefore, there was no change due to a vertical cut.

EXAMPLE 2

If the same object suddenly appears due to a scene change, then the CURRENT count will be 25, the DELAY count has 2 from a previous image, and the CHANGE count could be 27. In this situation, the difference between the CURRENT and DELAY counts is significant (25−2=23), thus a high weighting value of 92% is created. This value makes it likely that the CHANGE count represents a vertical-cut. 92% will be applied to the CHANGE count, resulting in a value approaching 25 (27×92%=24.84). If the adjusted CHANGE count is divided by the maximum count, then the percentage-of-change equals 99% (24.84/25=0.994). Therefore, most of the change that occurred is due to a vertical cut.

Figure 3:
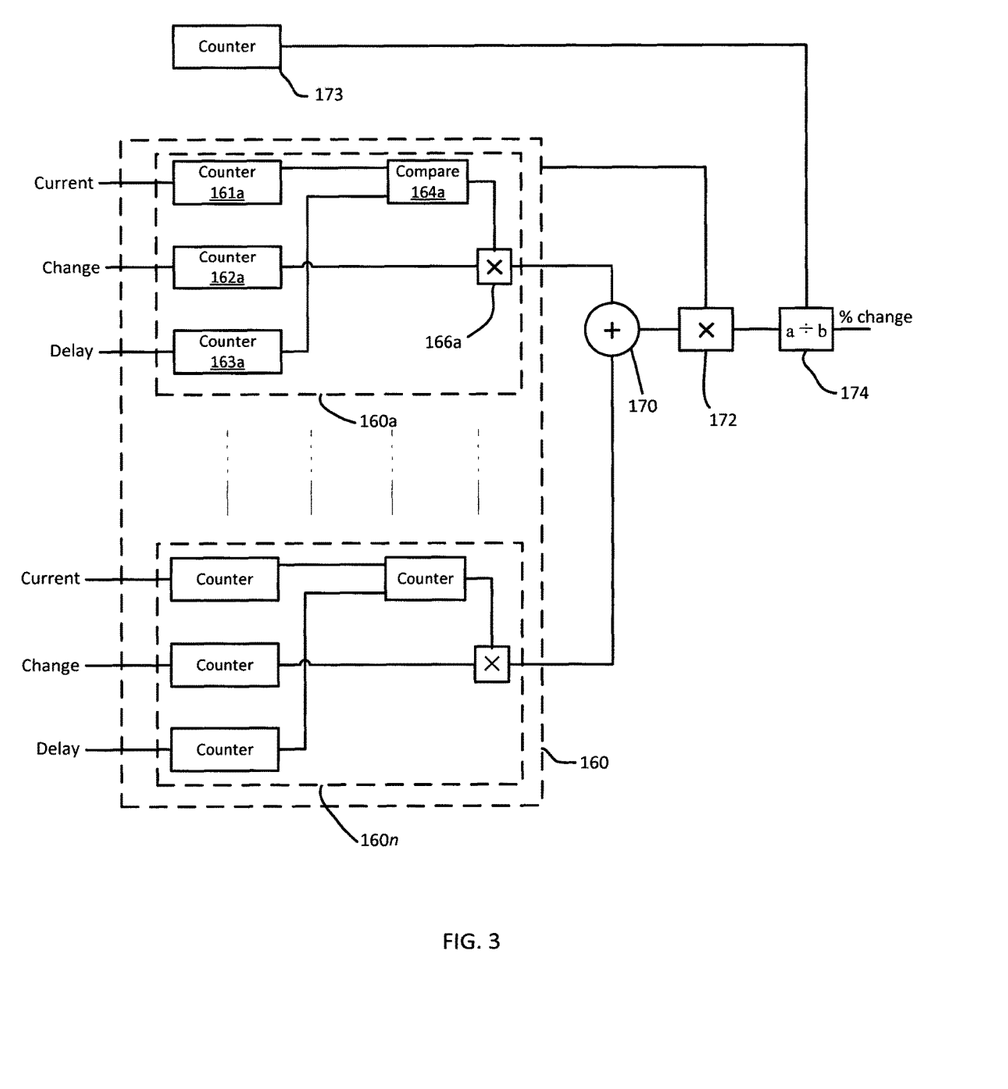
FIG. 3 is a block diagram illustrating a circuit for counting active pixels to determine a percentage of change.

The analysis begins by dividing the image into N multiple overlapping sections 160. In one embodiment, the image is divided into 16 sections or sub-images arranged in a 4×4 grid. This is done for two reasons. First, by requiring that change be distributed over half of the image, the possibility of falsely detecting a vertical cut is reduced when large objects move into the image from an edge. Second, by comparing the active pixel totals per section with the delayed image, an estimate of motion versus vertical cut can be made. Each section 160 of the image employs counters, which count the total number of active pixels in the current, delayed and change images. The counters employ a weighting scheme at the overlapping edges of the sections 160 to compensate for detail elements which are transitioning between sections. In one embodiment, active pixels are each counted as 1 at the outside edge of the section and gradually count as 8 for the section area that does not overlap. The total counts are then divided by 8. The totals of these counters are compared to determine if change has occurred, and further, the likelihood that the change is due to motion, or to an abrupt scene change, i.e., a vertical cut.

For example, section 160a includes three counters 161a, 162a, 163a. The current image CURRENT from node 103 is input to counter 161a, the delayed image DELAY from node 105 is input to counter 163a, and the changed image CHANGE from the OR gate 114 is input to counter 162a. The count of total active pixels in the current image (counter 161a) is compared with the count of total active pixels in the delayed image (counter 163a) by comparator 164a. The comparator 164a produces a weighting value from 0 to 1.0 based on the difference between CURRENT and DELAY counts. The count difference is divided by the larger of the CURRENT or DELAY counts to produce the weighting value. A value of zero would indicate the same number of active pixels occurred in both the current and delayed images, which typically happens when the same detail elements are in both images—such as an object in motion. A value of 1.0 would indicate a massive difference between the current and delayed images, which typically happens when a new detail element appears in one image—such as a vertical cut. The total active pixel count for the changed image (counter 162a) is input to a multiplier 166a where the count is multiplied by the weighting value, to produce an adjusted active pixel count for that section's changed image.

The total adjusted active pixel counts for the changed image in all count and compare sections 160 are added together by adding circuit 170 to produce a total changed pixel count. An additional weighting factor is applied to the total changed pixel count by multiplier 172 based upon the distribution of sections indicating a possible vertical cut. The weighting factor is determined by the number of sections having a comparator weighting value greater than 0.5 (more likely to be a vertical cut), divided by the number of sections. This additional step helps prevent false vertical cut detection by requiring that changes occur in multiple sections of the image. Finally, the active pixels within the CURRENT and DELAYED simplified image (all sections) are input to counter 173 to determine the total maximum pixel count for the entire image (MAX=the larger of the CURRENT or DELAY counts). The weighted total changed pixel count (A) from multiplier 172 is divided by the total maximum pixel count (B) from counter 173 in multiplier circuit 174 (configured as a divider circuit) to produce an 11-bit percentage-of-change value from the original image.

Figure 4:
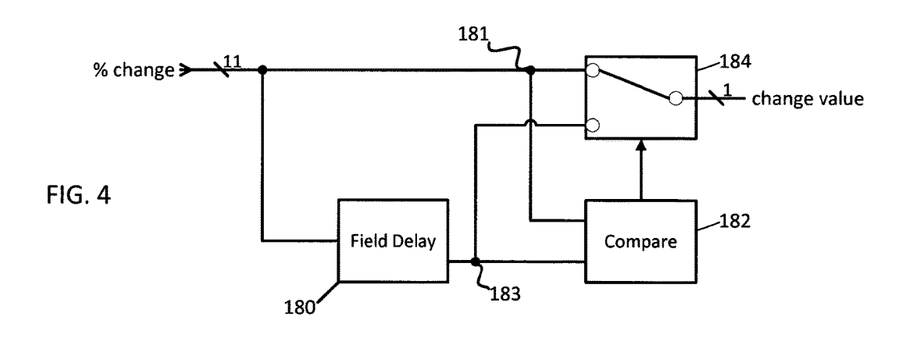
FIG. 4 is a block diagram illustrating a circuit that provides compensation for a telecine sequence.

Referring now to FIG. 4, the percentage-of-change value output from multiplier 174 is registered with a one-frame (two fields) delay element 180. This allows the percent-of-change value from the most recent image at node 181 to be compared by comparator 182 with the percentage-of-change value from the previous image, which is output from the delay element 180 at node 183. A selector circuit 184 then chooses the largest value from the comparator 182 as the final image-change value.

This comparison process compensates for a possible 3:2 sequence. Without this compensation, a video source that has a 3:2 sequence will produce a near-zero percentage-of-change every 5 fields. With this compensation, however, the near-zero value is replaced with a previous value, maintaining the natural progression of the percentage-of-change values during periods of motion.

The final image-change value is a measurement of how the video image changes from field to field. If there is no motion or no vertical cut, then the value will be zero. If there is motion, then the value indicates the amount of motion and is usually continuous over many consecutive fields. If a vertical cut occurs, then the value will suddenly increase in magnitude for three fields and then return to its nominal value.

Figure 5:
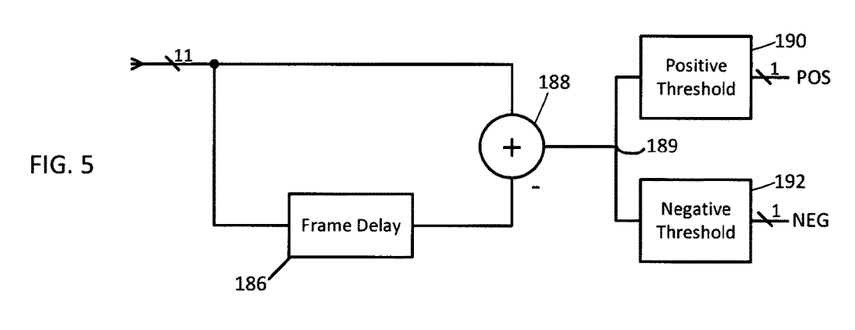
FIG. 5 is a block diagram illustrating a circuit for comparing the change value to positive and negative threshold values.

As shown in FIG. 5, the change-value for the final image is taken from selector circuit 184 and then registered with a one-frame (two fields) delay element 186. The output of the delay element 186 is a change-value for the delayed image, which is subtracted from the change-value for the final image using adding circuit 188 (configured as a subtracting circuit). This results in a measurement of change between images at node 189. The value of this measurement will be zero if there is no motion, or if there is motion at a constant velocity. A value other than zero will be produced only if the motion accelerates or decelerates, or if there is a vertical cut. The measurement of change at node 189 is compared to a positive change threshold set in comparator 190 and compared to a negative threshold set in comparator 192. A one-bit output from comparator 190 will be set if there is a large positive change in the image, while a one-bit output from comparator 192 will be set there is a large negative change in the image. The lack of an output from either comparator 190 or comparator 192 means there is negligible change in the image.

Figure 6:
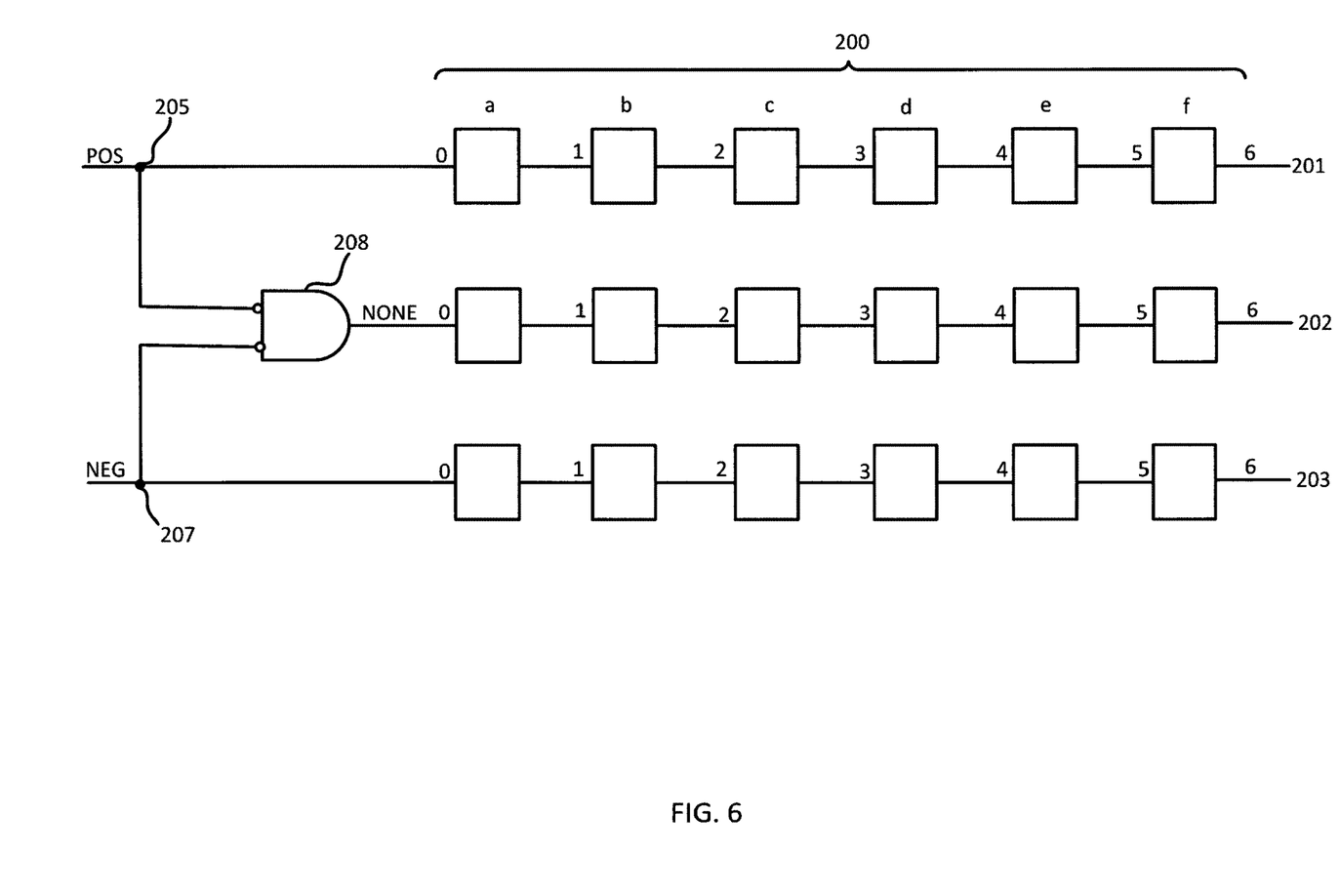
FIG. 6 is a block diagram illustrating a circuit having an array of field delay elements for comparing historical change values over a sequence of frames.
Figure 7:
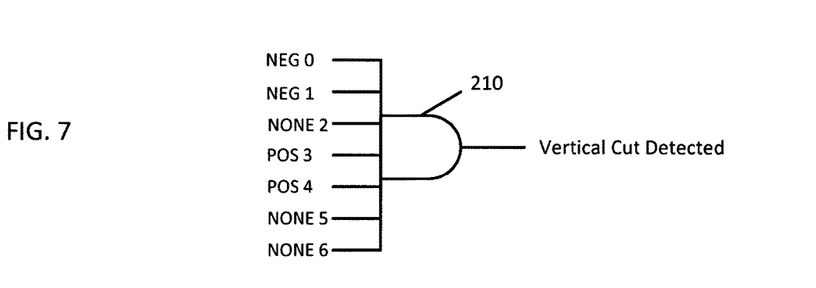
FIG. 7 is a block diagram illustrating the logic for detecting a vertical cut by evaluating a predefined pattern in the array of FIG. 6.

The large positive change and large negative change results are registered with a series of field delay elements 200, as shown in FIG. 6, to provide historical results, for example, from the six previous images. The one-bit output POS from comparator 190 is provided as input via node 205 to a series-connected row 201 of delay elements starting at a first delay element 201a. The output of the first delay element 201a is provided as input to a second delay element 201b, which generates an output that is input to third delay element 201c, and so on, until sixth delay element 201f. Likewise, the one-bit output NEG from comparator 192 is provided as input via node 207 to a series-connected row 203 of delay elements starting at first delay element 203a, which generates an output that is input to a second delay element 203b, which generates an output that is input to a third delay element 203c, and so on, until sixth delay element 203f.

The POS input at node 205 and the NEG input at node 207 are also provided as inputs to NAND gate 208. The output of the NAND gate 208 is the NONE bit, which is set to active if both the POS input and the NEG input are not active. The NONE bit is provided as input to a series-connected row 202 of delay elements starting at a first delay element 202a, which generates an output that is input to a second delay element 202b, which generates an output that is input to a third delay element 202c, and so on, until sixth delay element 202f.

By analyzing the results over a set of current and previous fields, a pattern will emerge to detect if a vertical cut has occurred. For example, in one embodiment, the pattern detected at the outputs of the array of field delay elements 200 will be <none, none, positive, positive, none, negative, negative>, which has been empirically determined to positively indicate a vertical cut. This pattern may be readily detected using AND gate 210, as shown in FIG. 9, and to combine as inputs to the AND gate the inputs to delay elements 203a, 203b, 202c, 201d, 201e, 202f, as well as the output of delay element 202f.

4. Process for Detecting Vertical Cuts

Figure 8:
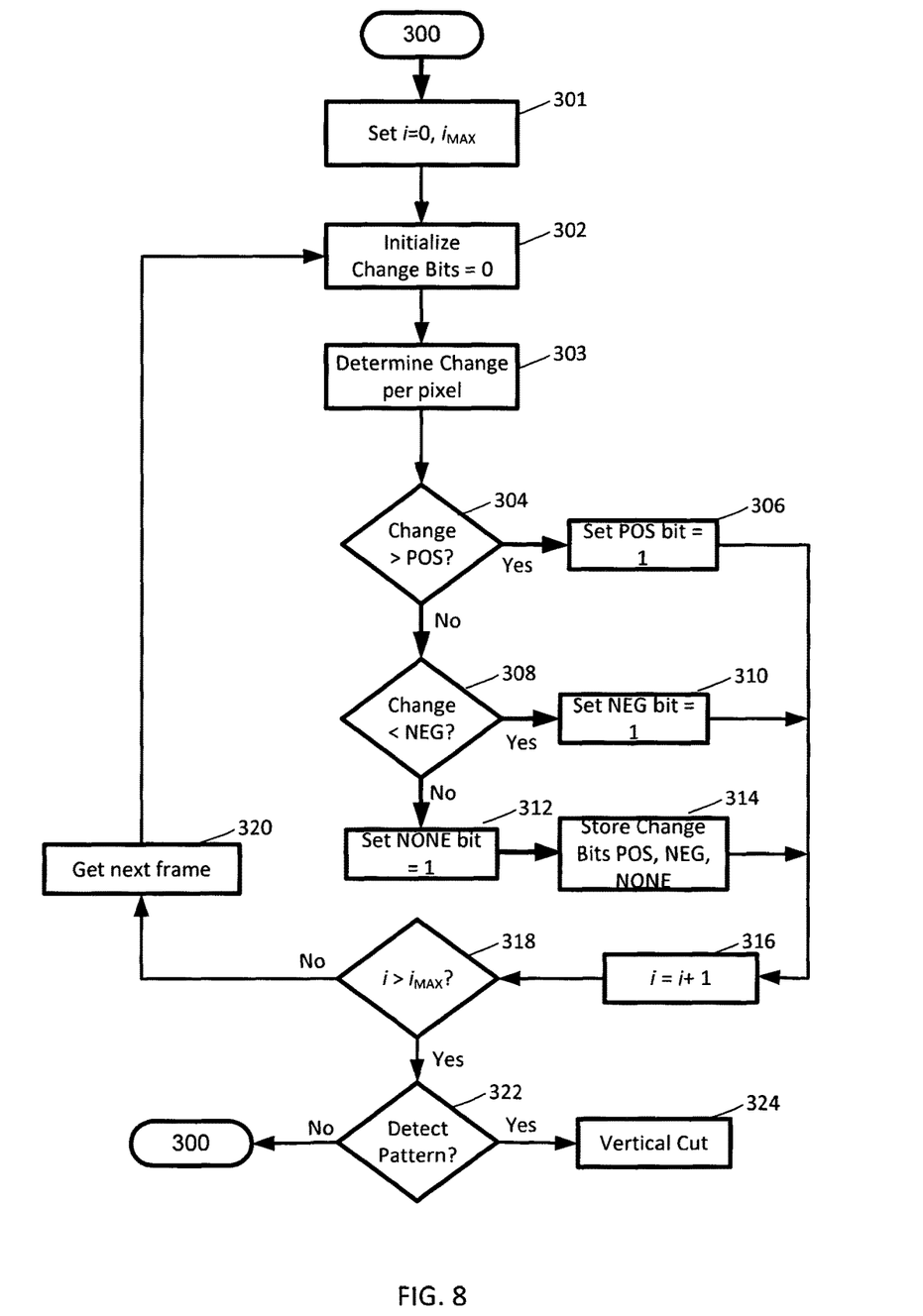
FIG. 8 is a flow chart illustrating a process for detecting a vertical cut in a sequence of video frames.

A process 300 is illustrated in FIG. 8 for analyzing a sequence of digital video images in order to detect a vertical cut. Each field or frame of the video images may be analyzed in real-time using a hard-wired circuit system as described above. However, it is conceivable that a computer-implemented embodiment could also be produced, as will now be described.

In step 301, a process index i is initialized and set equal to zero, and a maximum value $i_{MAX}$ for the process index i is defined. The maximum value $i_{MAX}$ for the process index i is the number of sequential frames to evaluate in the process 300 for making a determination regarding a vertical cut. In one embodiment, the maximum value $i_{MAX}$ is set to 6, i.e., a series of 6 sequential frames will be evaluated to see if a predefined pattern of change in the sequence of images can be detected. If the predefined pattern of change is detected for the selected number of frames, then a vertical cut is indicated.

In step 302, a set of three change bits, namely a first change bit, a second change bit, and a third change bit, is initialized by clearing the bits, i.e., setting the bits to 0. A bit with a 0 value is considered cleared or inactive herein, while a bit which is set to 1 is considered active.

In step 303, a change value is determined between each pixel of a current frame and each pixel of a delayed frame of the video signal. The determination of a change value in step 302 is a key part of the process 300, and is described in more detail below.

In step 304, the change value is compared to a first or positive threshold, which is set to a large positive value. If the change value is greater than the positive threshold, meaning that the change value is a large positive value, then the first change bit (POS) is set to 1 in step 306. If the change value is not greater than the positive threshold in step 304, then the change value is compared to a second or negative threshold in step 308. The second threshold is set to a large negative value. If the change value is less than the negative threshold, meaning that the change value is a large negative value, then the second change bit (NEG) is set to 1 in step 310. If the change value is not less than the negative threshold in step 308, then it was also not greater than the positive threshold in step 304, and therefore the third change bit (NONE) is set to 1 in step 312, indicating that the change between the current and delayed images is zero or negligible.

In step 314, the three change bits are stored in a data store. Only one of the three change bits will be set to an active state in one of steps 306, 310, or 312, and the other two change bits are not set, i.e., they remain in an inactive or cleared state from step 302.

In step 316, the process index i is incremented to i+1. In step 318, the process index i is compared to a preset maximum value $i_{MAX}$. If the process index i is less than or equal to the preset maximum value $i_{MAX}$, then the next sequential frame will be retrieved in step 320, and the process returns to step 302 to determine and evaluate the change values for the next frame.

However, if the process index i is greater than the preset maximum value $i_{MAX}$ in step 318, then an adequate number of frames have been examined. At this point, the data store has stored a series of change bits corresponding to a sequence of frames, each discrete set of POS, NEG and NONE change bits describing a specific frame.

In step 322, the series of change bits in the data store are examined for a specific predefined pattern. If the predefined pattern is detected, then a vertical cut has likewise been detected and is reported in step 324. If the predefined pattern is not detected, then a vertical cut has not been detected, and another sequence of frames can be evaluated using process 300.

Figure 9A:
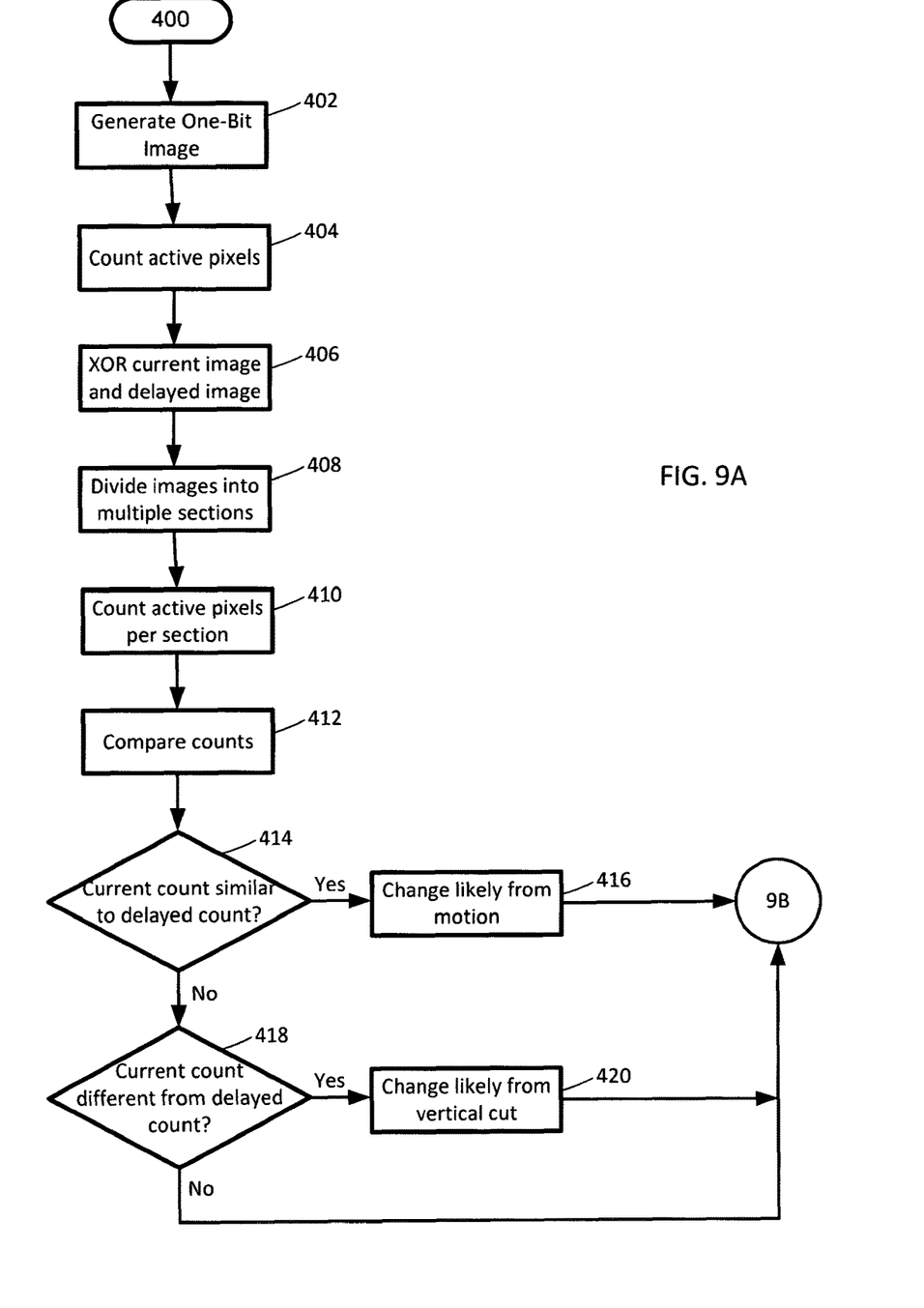
FIGS. 9A and 9B are flow charts illustrating more details of the process shown in FIG. 8 for detecting a vertical cut in a sequence of video frames.
Figure 9B:
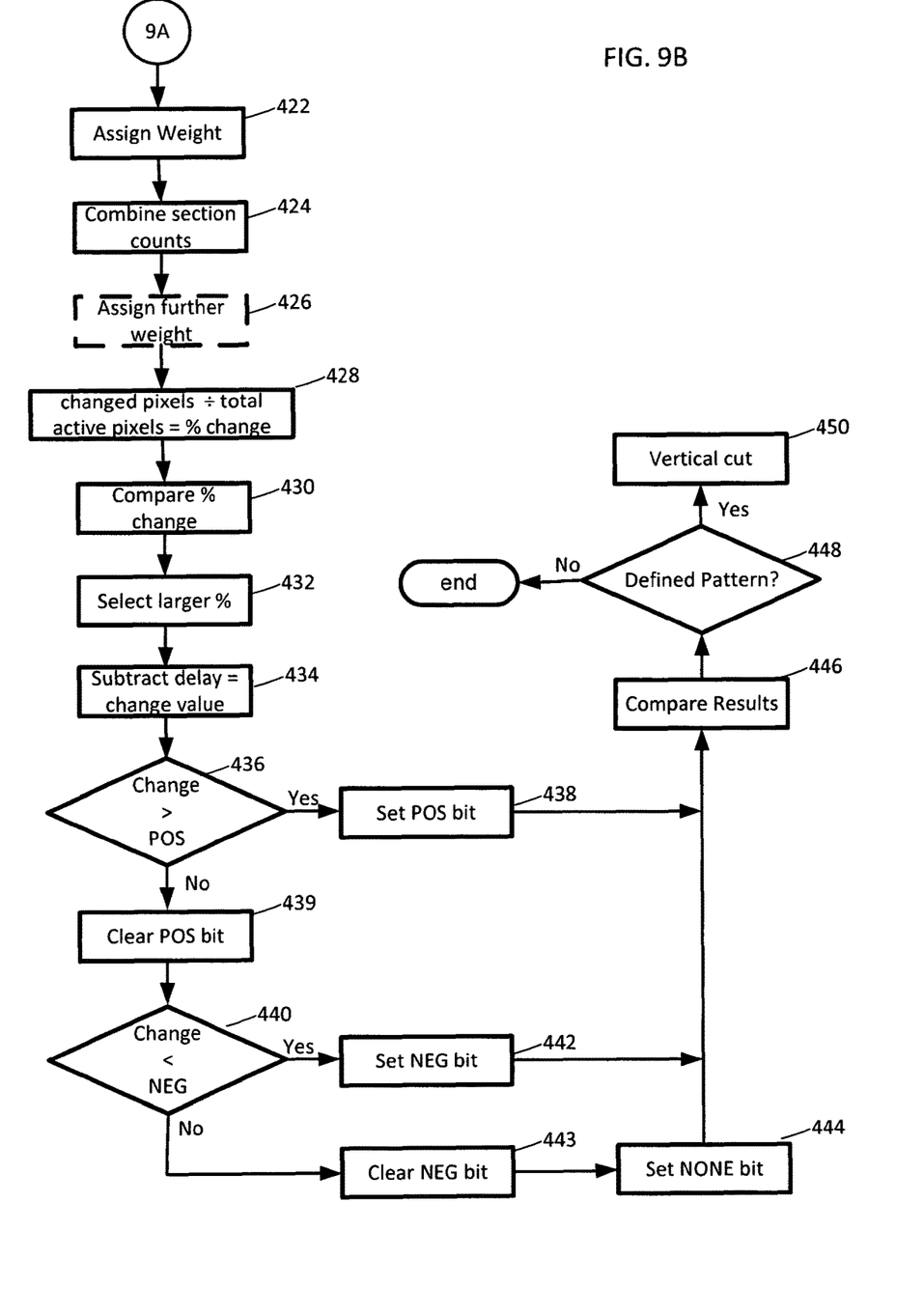

FIGS. 9A and 9B illustrate a process 400 for analyzing a sequence of digital video images in order to detect a vertical cut. Process 400 is consistent with process 300 but includes more process details.

In step 402, a simplified one-bit representation of the image is generated for each pixel. The bit is set as active only where picture detail is present in the pixel, and if there is no detail in the pixel, the bit is cleared. In step 404, all the active one-bit pixels of the simplified image are counted to yield a total number of active pixels, to be used later in the process to determine a percentage-of-change in the image.

In step 406, the active pixels of the current simplified image are combined using an exclusive-OR function (XOR) with the active pixels of the previous (delayed) simplified image (i.e., from the previous frame or two fields) to produce a new (changed) image representing the change between frames. In the changed image, the one-bit pixels are active only where image detail has changed. In step 408, the simplified-image, the delayed simplified-image, and the change-image are each divided into multiple sections, wherein each section represents a portion of the overall image. In step 410, for each section, the active one-bit pixels are counted to produce a total number of active pixels.

In step 412, for each section, the active pixel counts for the current image and the delayed image are compared. If the total active pixel count for the current image is similar to the total active pixel count for the delayed image in step 414, then any differences in the image are likely attributed to motion in step 416. If the total active pixel count for the current image is not similar to the total active pixel count for the delayed image in step 414, but instead, the count is significantly different in step 418, then any differences in the image are likely attributed to vertical cuts in step 420.

In step 422, the total active pixel count for the changed image in each section is assigned a weight based upon the result of steps 412-420. If it was determined that the changes resulted from a vertical cut, then the changed image is assigned a larger weighting factor. If instead it was determined that the changes resulted from motion, then the changed image is assigned a smaller weighting factor. The weighting factors are discussed further below.

In step 424, the total active pixel counts for all sections of changed images are combined to produce a total number of active changed pixels for the entire image. This value may be assigned an additional weighting factor in step 426 based upon the distribution of sections.

In step 428, the total number of active changed pixels is divided by the total number of active pixels from the larger of the current or delayed images to produce a percentage-of-change for the current image. In step 430, the percentage-of-change for the current image is compared with the percentage-of-change for the delayed image of the previous field, and the larger of the two values is chosen as the final change-value in step 432. This is the mechanism used to filter out any incorrect low values produced by a 3:2 sequence.

The final change-value is combined with the change-value of the previous frame (two fields) in step 434 by subtracting the frame-delayed value from the final change-value to produce a delta-change value. The delta-change value is compared to a positive threshold. If the delta-change value is greater than the positive threshold in step 436, then a first bit is set=1 in step 438. Otherwise, the first bit is cleared in step 439, and the delta-change value is compared to a negative threshold. If the delta-change value is less than the negative threshold in step 440, then a second bit is set=1 in step 442. Otherwise, the second bit is cleared in step 443, and a third bit is set=1 in step 444. Only one of the first, second and third bits is set=1 is the above comparisons, and the other two bits remain cleared, i.e. =0.

Historical results from the comparison steps over a number of frame sequences are evaluated in step 446. Advantageously, an array of first, second and third bits corresponding to a sequence of frames may be stored in a data store, as further described below, and the array may be evaluated to determine if the array contains a particular predefined pattern of the bits. If the predefined pattern is detected in step 448, then an output is generated indicating a vertical cut in step 450. Thus, alteration of the video signal may be implemented by adding or removing frames at the position of the vertical cut identified by the process.

5. Hardware/Software Environment

Embodiments of this disclosure are preferably implemented as hard-wired circuits, but can also be implemented in numerous other ways, including as a process, an apparatus, a system, a device, a method, a computer readable medium such as a computer readable storage medium containing computer readable instructions or computer program code, or as a computer program product comprising a computer usable medium having a computer readable program code embodied therein. Thus, the digital signal processing elements described herein can be one or more computer-based devices, running a conventional operating system, and coded using well-known programming languages, including C, C++, C#, Pascal, Fortran, Perl, Matlab (from MathWorks), SAS, SPSS, JavaScript, CoffeeScript, Objective-C, Objective-J, Ruby, Python, Erlang, Lisp, Scala, Clojure, Java, and other known programming languages.

In the context of this disclosure, a computer usable medium or computer readable medium may be any non-transitory medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information.

6. Conclusion

Those skilled in the art will appreciate that known techniques for measuring and cropping the corollary audio signal, such as, for example, those disclosed in U.S. Pat. No. 7,092,774, which is incorporated herein by reference, can be used in conjunction with the video signal alteration techniques disclosed above to provide a time altered audio/video program signal. It should be understood that the particular embodiments of the subject matter described above have been provided by way of example and that other modifications may occur to those skilled in the art without departing from the scope of the claimed subject matter as expressed by the appended claims and their equivalents.

The invention claimed is:

1. A method, comprising:
   receiving, in real-time, a video program segment having a sequence of digital video images, each digital video image having a plurality of multi-bit pixels;
   generating, for each multi-bit pixel, a single-bit indicator that is set when the pixel is active and cleared when the pixel is not active;
   counting the single-bit indicators that are set to represent active pixels in each one of adjacent frames of the sequence of digital video images, wherein a vertical cut is not detected when the count between adjacent frames is approximately the same;

calculating a percentage of change value between adjacent frames when the count between adjacent frames is not approximately the same;
comparing the percentage of change value to a positive threshold value and a negative threshold value, wherein a positive change bit is set when the percentage of change value exceeds the positive threshold value, a negative change bit is set when the percentage of change value exceeds the negative threshold value, and a no change bit is set when the percentage of change value does not exceed the positive threshold value or the negative threshold value;
analyzing a pattern of the positive change bits, the negative change bits, and the no change bits over a plurality of sequential digital video images;
determining that a vertical cut has occurred in the sequence of digital video images when the pattern of the positive change bits, negative change bits, and no change bits matches a pre-defined pattern; and
adding or removing individual frames in real-time at the location of the vertical cut to alter a duration of the video program segment.

2. The method of claim 1, the generating step further comprising:
filtering each multi-bit pixel to remove any pixel values that match corresponding pixel values of a neighboring multi-bit pixel;
comparing a value of the filtered pixel to a filter threshold value; and
setting the single-bit indicator when the filtered pixel value is equal to or greater than the filter threshold value and clearing the single-bit indicator when the filtered pixel value is less than the filter threshold value.

3. The method of claim 2, wherein the filter threshold value is set by using an adaptive filter method.

4. The method of claim 1, further comprising:
dividing each digital video image into a plurality of sections;
generating a plurality of single-bit indicators for each section; and
performing the steps of counting single-bit indicators and calculating a percentage of change value for adjacent sections.

5. The method of claim 1, further comprising:
the receiving step including receiving a first digital video image as a current image, wherein each multi-bit pixel of the current image is represented by a first single-bit indicator that is set when the pixel is active and is cleared when the pixel is not active;
generating a delayed image as a one frame delay of the current image, wherein each multi-bit pixel of the delayed image is represented by a second single-bit indicator that is set when the pixel is active and is cleared when the pixel is not active;
generating a changed image by combining the simplified current image and the simplified delayed image, wherein each multi-bit pixel of the changed image is represented by a third single-bit indicator that is set when either but not both of the first indicator bit and the second indicator bit are set;
dividing the current image, the delayed image, and the changed image, into a plurality of sections;
for each section, determining a first count of the first single-bit indicators that are set, a second count of the second single-bit indicators that are set, and a third count of the third single-bit indicators that are set; and
for each section, comparing the first count and the second count, wherein a change in the digital video image is due to motion when the first count and the second count are approximately the same, and wherein the change in the digital video image is due to a vertical cut when the first count and the second count are not approximately the same.

6. The method of claim 5, further comprising:
generating a first total count of first counts across all sections, a second total count of second counts across all sections, and a third total count of third counts across all sections;
dividing the third total count by the larger of the first total count or the second total count, wherein the result is the percentage change in the digital video image.

7. The method of claim 6, further comprising:
assigning a small weight to the third total count when the first count and the second count are approximately the same, and assigning a large weight to the third total count when the first count and the second count are not approximately the same.

8. The method of claim 6, further comprising:
comparing a first percentage change in the current image with a second percentage change in the delayed image;
selecting a final percentage change as the larger value of the first percentage change and the second percentage change;
subtracting the second total count from the first total count resulting in a delta value;
comparing the delta value to a delta positive threshold, wherein a first bit is set if the delta value is greater than the delta positive threshold and the first bit is cleared otherwise;
comparing the delta value to a delta negative threshold when the first bit is cleared, wherein a second bit is set if the delta value is less than the delta negative threshold and the second bit is cleared otherwise;
setting a third bit when the second bit is cleared; and
evaluating a pattern of the first, second and third bits over a plurality of digital video images.

9. The method of claim 6, further comprising:
prior to the step of generating, for each multi-bit pixel, a single-bit indicator, applying a mask to the pixel to filter out small changes in motion relative to neighboring pixels.

10. The method of claim 9, wherein the mask is generated by stretching the pixel both horizontally and vertically.

11. A method, comprising:
receiving, in real-time, a video program segment having a sequence of digital video images, each digital video image having a plurality of multi-bit pixels;
processing each digital video image by generating, for each multi-bit pixel:
a first single-bit indicator for a current image, the first single-bit indicator being set when the pixel is active and the first single-bit indicator being cleared when the pixel is not active,
a second single-bit indicator from the first single-bit indicator for a delayed image, the second single-bit indicator is the first single-bit indicator delayed by one frame, and
a third single-bit indicator from the first and second single-bit indicators for a changed image, the third single-bit indicator being set when either but not both of the first and second single-bit indicators are set;

calculating a percentage-of-change value for the current image from a count of the active pixels in the current image, the delayed image, and the changed image;

comparing the percentage-of-change value for the current image with a positive threshold value and a negative threshold value, wherein a positive change bit is set when the percentage-of-change value exceeds the positive threshold value, a negative change bit is set when the percentage-of-change value exceeds the negative threshold value, and a no change bit is set when the percentage-of-change value does not exceed either the positive threshold value or the negative threshold value;

analyzing a pattern of the positive change bits, the negative change bits, and the no change bits for a plurality of sequential digital video images;

determining that a vertical cut has occurred in the sequence of digital video images when the pattern of the positive change bits, the negative change bits, and the no change bits matches a pre-defined pattern; and adding or removing individual frames in real-time at the vertical cut to alter a duration of the video program segment.

\* \* \* \* \*